United States Patent [19]

Rodionova et al.

[11] Patent Number: 5,660,880
[45] Date of Patent: Aug. 26, 1997

[54] ANTI-OXIDATION PROTECTION OF CARBON-BASED MATERIALS

[75] Inventors: Valeriya Veniaminovna Rodionova; Gennady Alexandrovich Kravetkii; Nadezhda Miklailovna Schestakova; Andrey Vasiljevich Kuznetzov; Valery Ivanovich Kostikov; Alexander Victorovich Demin, all of Moscow, Russian Federation

[73] Assignees: Aerospatiale Societe Nationale Industrielle, France; Nii, Grafit Research Institute, Russian Federation

[21] Appl. No.: 464,608
[22] PCT Filed: Dec. 16, 1993
[86] PCT No.: PCT/FR93/01256
   § 371 Date: Jun. 19, 1995
   § 102(e) Date: Jun. 19, 1995
[87] PCT Pub. No.: WO94/14729
   PCT Pub. Date: Jul. 7, 1994

[30] Foreign Application Priority Data

Dec. 18, 1992 [RU] Russian Federation ........ 92012719/33

[51] Int. Cl.$^6$ .......................... C23C 16/00; C04B 41/87
[52] U.S. Cl. .................. 427/248.1; 427/249; 427/255.4; 427/427
[58] Field of Search ................. 427/248.1, 427, 427/255.4, 249; 428/408

[56] References Cited

U.S. PATENT DOCUMENTS

| | | | |
|---|---|---|---|
| 3,770,487 | 11/1973 | Gibson et al. | 376/414 |
| 5,368,940 | 11/1994 | Takei et al. | 428/408 |

FOREIGN PATENT DOCUMENTS

| | | | |
|---|---|---|---|
| 0428977 | 11/1990 | European Pat. Off. | C04B 35/52 |
| 0435039 | 12/1990 | European Pat. Off. | C04B 41/87 |
| 0448432 | 3/1991 | European Pat. Off. | C04B 41/87 |
| 11224652 | 3/1961 | Germany . | |

*Primary Examiner*—Roy V. King
*Attorney, Agent, or Firm*—Hayes, Soloway, Hennessey, Grossman & Hage, P.C.

[57] ABSTRACT

The invention relates to a process for obtaining refractory antioxidative coatings on carbon-based materials and articles operating in an oxidizing environment at temperatures of up to 2000° C. under thermal cycling and high-speed gas stream conditions. The process comprises the heat-treatment of the surface to be protected in silicon vapors and is characterized in that prior to said silicon vapor treatment, the surface to be protected is covered with a layer of the composition consisting of $HfB_2+C$ powdery filler and a carboxymethyl cellulose-based binder, followed by drying under normal conditions till it is completely dry. The process is intended for oxidation protection of structural elements and articles in metallurgy, aircraft, and other industries.

8 Claims, No Drawings

ANTI-OXIDATION PROTECTION OF CARBON-BASED MATERIALS

The present invention relates to the field of production of carbon materials and articles and is intended for oxidation protection of parts operating in an oxidizing environment at high temperatures. Such materials and articles can be useful in metallurgy (furnace lining, heaters for electric sets, etc.), aircraft and other industries where such protection of structural elements and articles is required.

DESCRIPTION OF PRIOR ART

Widely known in the art are processes for applying protective antioxidative coatings onto carbon articles, which are mainly directed at forming a surface layer of refractory inorganic substances, in particular refractory metal carbides and borides.

Also known in the art is a process for applying a protective antioxidative silicon carbide coating onto carbon-carbon articles, according to which an article is first placed into silicon filling [Carry D. M., Cunningham J. A. Frahm J. R., Space Shuttle Orbiter leading edge structural subsystem thermal performance. AIAA Paper No. 82-0004]. And here silicon carbide is formed in the article material surface layer as a result of silicon diffusion and temperature exposure. Then the article is repeatedly impregnated (up to 6 times) in a tetraoxymethyl silicate solution, with intermediate drying after each impregnation cycle to ensure gas impermeability.

The thus obtained coating is useful for operating in a high-speed stream of dissociated air at 1600° to 1650° C.

This process makes it possible to obtain a coating whose composition is limited to certain components and is characterized by a high labour input in view of the necessity in repeated impregnations of the article at a relatively low upper limit of the coating operating temperatures.

Further known in the art is a process for obtaining a protective coating on a carbon material via depositing silicon and hafnium carbides, as well as hafnium silicide, from a gaseous mixture of silicon and hafnium chlorides, methane, and hydrogen [CVD multilayer protective coating. Proceedings of the 35th International SAMPE Symposium-35, No. 2, p. 1348–1355, 1990]. The reaction mixture is fed onto a preheated surface to be protected, and the interaction of the mixture components results in depositing silicon carbide, hafnium carbide, and hafnium silicide on the article surface.

This process makes it possible to obtain a heat-resistant multicomponent coating operable in the temperature range of up to 1800° C., yet requires special equipment, and is ecologically unsafe.

Still further known in the art is a process for obtaining boride-oxide protective coatings on carbon-based materials by impregnation thereof with a mixture of phenol or furyl resins and refractory metals (vanadium, chromium, niobium, molybdenum, tungsten), as well as boron-containing components (amorphous boron, boron carbide, boron nitride), drying, heat-treating in a neutral medium [FR, A, 2,128,809].

The thus obtained coating has a low thermal resistance (up to 1000° C.) in view of the structure porosity.

Still further known in the art is a process for obtaining a protective hafnium diboride and silicon carbide coating using a low-pressure plasma, according to which the powdery coating components are fed by a plasma Jet onto the surface to be protected [Process for applying $HfB_2+20SiC$ coating from low-pressure plasma. Catalogue of United Technologies Corp., 1988]. This process makes it possible to obtain a multicomponent coating operable at temperatures of up to 2000° C. in an oxidizing gas atmosphere.

However when applying the coating onto large size articles, special equipment is required with a controlled atmosphere and a working space more than twice as large as the size of the articles to be coated. Moreover, it is practically impossible to uniformly apply coatings onto articles of intricate configurations having deep cavities and narrow grooves.

Still further known in the art is a CVR-Si process for obtaining protective coatings which comprises reaction bonding of the substrate material carbon with silicon via treating the surface to be protected in molten silicon vapors [Pyrobond PB-1300 material, Ultra Carbon Co. Catalogue, 1982].

In this case, an impermeable silicon carbide film is formed in the article surface layer.

Such a process is limited to obtaining a silicon carbide protective layer only as a thin film which tends to crack under thermal cycling i.e. is non-durable. The oxidation resistance of such a coating is limited to service temperatures not higher than 1750° C.

DISCLOSURE OF INVENTION

The invention is directed at obtaining by a CVR-Si process a surface multicomponent coating on carbon-based materials and articles operable over a long period of time under thermal cycling at temperatures up to 2000° C., including high-temperature gas stream conditions.

The solution of the problem pursued is ensured by the fact that according to the claimed process for obtaining protective coatings on carbon-based materials and articles which comprises treating the surface to be protected with silicon vapors during heat treatment thereof, prior to the silicon vapor exposure a layer of a composition consisting of $HfB_2+C$ powdery filler and a carboxymethyl cellulose-based binder is applied onto the surface to be protected, followed by drying under normal conditions till the complete drying is attained.

Preferably, the composition to be applied contains 95% by weight $HfB_2+5\%$ by weight C, with carbon black, coke, or artificial graphite being used as the carbon constituent (C), and a 5% aqueous solution of carboxymethyl cellulose in a volume ratio of 1:1 to the powdery components as the binder, and the $HfB_2+C$ layer is exposed to silicon vapors under a pressure of not higher than 10 Hg mm, at a temperature of about 1850°+50° C. (1850° to 1900° C.), for 1 to 3 h.

Preferably, the above composition layer is applied onto a non-siliconized (pure carbon) substrate composite.

Hafnium boride which is present in the composition to be applied onto the article surface, imparts to the coating improved refractoriness and coefficient of thermal expansion (CTE) close to that of the substrate composite (article).

The carbon constituent (C) provides an improved adhesion of the coating to the substrate material. The $HfB_2+C$ coating and the carbon-based substrate exposure to silicon vapors leads to the silicon reacting with the carbon of the coating and of the substrate material resulting in the formation of silicon carbide both within the coating and in the substrate material surface layer. In this case, a boundary between the coating and the substrate becomes vague due to interpenetration of the carbides being formed in the coating and in the substrate material. Finally, a coating having a $HfB_2+SiC+Si$ compositions is formed.

Thus, the application of the protective composition onto a non-siliconized article surface provides not only an improved adhesion between the coating and the carbon-based substrate but also a decrease of the number of processing steps, with all that this implies.

PREFERRED EMBODIMENT OF INVENTION

For the claimed process embodiment, a powdery filler having a composition of 95% by weight $HfB_2+5%$ by weight C is prepared by thoroughly stirring the above components. To the resulting mixture an equal volume fraction of a 5% aqueous solution of carboxymethyl cellulose is added and stirred till a homogeneous mass is obtained.

The above mass is applied by brushing or spraying onto the surface to be protected and dried under normal conditions till complete drying is attained, this step being repeated three times. The coated article is then placed into an electric vacuum furnace along with a silicon filling. The heat treatment is conducted under the following conditions:

| | |
|---|---|
| * Pressure | not higher than 10 Hg mm |
| * Temperature | 1850 + 50° C. |
| * Holding time at a given temperature | 1 to 3 h |

The carbon constituent content in the composition to be applied of less than 5% leads to the increase of the coating CTE and makes its cracking and peeling off the substrate more probable. On the other hand, increasing the carbon constituent content above 5% results in an increased brittleness of the protective coating due to the formation of silicon carbide in large amounts.

A 5% aqueous solution of carboxymethyl cellulose used as the binder due to its good wettability provides a uniform spreading of the applied composition over the substrate surface till an optimal thickness is obtained.

At the carboxymethyl cellulose concentrations lower than 5% the resulting coating gets loose and exhibits poor adhesion to the substrate material. With the concentrations above 5%, the applied composition forms a non-uniform layer, the application thereof on sharp edges and cavities present on the article surface being difficult.

Similar considerations form the basis for defining the powdery filler/binder ratio.

When defining conditions for the coated article heat treatment in silicon vapors, the main concern is to provide conditions under which maximum silicon evaporation and highest achievable carbon conversion to silicon carbide will occur. For example, at a pressure above 10 Hg mm in the furnace working space, the evaporation rate is not sufficient to provide the total carbon conversion to silicon carbide.

At temperatures lower than 1850° C., the silicon evaporation rate decreases resulting in an incomplete interaction between the carbon and silicon as well as in lowering the coating oxidation resistance. Above 1900° C., the silicon carbide formed starts to decompose thus lowering the coating oxidation resistance.

Holding the coated article at the above temperature for less than 1 h fails to provide a complete carbonization of the carbon particles whereas the exposure of over 3 h gives rise to excess growth of silicon carbide crystals which results in an increased gas permeability and brittleness of the coating.

An advantage of such a process for obtaining protective coatings on carbon-based materials and articles is that the resulting coating is readily adaptable to service conditions.

During the coating reaction with the service environment oxygen, complex refractory hafnium-containing borosilicate glasses are formed to provide not only the carbon substrate protection at high temperatures but also (by virtue of the glasses transition to a viscoelastic state at service temperatures) self-healing of defects (cracks, microcraters) being formed therein.

Another advantage of the claimed process is that it combines the siliconization with the formation of a surface antioxidative refractory coating.

In order to gain a more penetrating insight into the present invention, Examples are given below to illustrate the coating process parameters effect on the performance of carbon-based materials having such a coating.

Onto samples of a siliconized graphite of o 40*40 mm, a coating of the above composition was applied and heat treated in silicon vapors under the above conditions. The coated samples were then heated in an induction furnace at a temperature not lower than 1750° C. for 30 min. under the natural atmospheric air convection.

As the performance criterion of the coating was taken a sample mass loss (% by weight) over a test period.

The results obtained are given in Table 1.

TABLE 1

| | Content, % by weight | | Binder solution concentration | Binder/filler | Heat treatment conditions | | | Testing | Mass |
|---|---|---|---|---|---|---|---|---|---|
| Sample 1 | $HfB_2$ 2 | C coke 3 | % CMC*) 4 | ratio (parts by weight) 5 | Pressure, Hg mm 6 | Temperature, °C. 7 | Holding time, h 8 | Temperature °C. 9 | loss % 10 |
| 1 | 95 | 5 | 5 | 1:1 | 5 | 1850 + 50 | 1,5 | 1750 | +0,18 |
| 2 | 95 | 5 | 5 | 1:1 | 5 | 1850 + 50 | 1,5 | 2000 | −2,32 |
| 3 | 95 | 5 | 5 | 1:1 | 5 | 1850 + 50 | 1,5 | 2100 | −22,69 |
| 4 | 90 | 10 | 5 | 1:1 | 5 | 1850 + 50 | 1,5 | 1750 | −16,80 |
| 5 | 98 | 2 | 5 | 1:1 | 5 | 1850 + 50 | 1,5 | 1750 | −10,61 |
| 6 | 95 | 5 | 8 | 1:1 | 5 | 1850 + 50 | 1,5 | 1750 | −9,68 |
| 7 | 95 | 5 | 2 | 1:1 | 5 | 1850 + 50 | 1,5 | 1750 | −12,65 |
| 8 | 95 | 5 | 5 | 0,7:1,3 | 5 | 1850 + 50 | 1,5 | 1750 | −9,32 |
| 9 | 95 | 5 | 5 | 1,3:0,7 | 5 | 1850 + 50 | 1,5 | 1750 | −11,45 |

TABLE 1-continued

| Sample 1 | Content, % by weight | | Binder solution concentration % CMC*) 4 | Binder/filler ratio (parts by weight) 5 | Heat treatment conditions | | | Testing Temperature °C. 9 | Mass loss % 10 |
|---|---|---|---|---|---|---|---|---|---|
| | HfB$_2$ 2 | C coke 3 | | | Pressure, Hg mm 6 | Temperature, °C. 7 | Holding time, h 8 | | |
| 12 | 95 | 5 | 5 | 1:1 | 10 | 1850 + 50 | 1,5 | 1750 | −1,48 |
| 14 | 95 | 5 | 5 | 1:1 | 18 | 1850 + 50 | 1,5 | 1750 | −3,79 |
| 15 | 95 | 5 | 5 | 1:1 | 5 | 1700 + 20 | 1,5 | 1750 | −5,18 |
| 16 | 95 | 5 | 5 | 1:1 | 5 | 1930 + 20 | 1,5 | 1750 | −7,34 |
| 17 | 95 | 5 | 5 | 1:1 | 5 | 1850 + 50 | 1,0 | 1750 | +0,09 |
| 18 | 95 | 5 | 5 | 1:1 | 5 | 1850 + 50 | 3,0 | 1750 | +0,16 |
| 19 | 95 | 5 | 5 | 1:1 | 5 | 1850 + 50 | 0,5 | 1750 | −0,57 |
| 20 | 95 | 5 | 5 | 1:1 | 5 | 1850 + 50 | 5,0 | 1750 | −4,72 |
| 21 | 95 | 5**) | 5 | 1:1 | 5 | 1850 + 50 | 1,5 | 1750 | −1,31 |
| 22 | 95 | 5***) | 5 | 1:1 | 5 | 1850 + 50 | 1,5 | 1750 | −0,65 |
| 23#) | — | — | — | — | 5 | 1850 + 50 | 1,5 | 1750 | −18,43 |

*) Carboxymethyl cellulose
**) Carbon black
***) Artificial graphite
) Prototype Furthermore, coatings obtained according to the claimed process were tested under conditions simulating those in the real service. They were applied on carbon-based articles of various configurations and dimensions including those made of a carbon-carbon composite, and upon appropriately treating were subjected to testing.

EXAMPLE 1

Onto samples of a two-dimensional siliconized carbon-carbon material based on a TNU (THY) low-modulus fabric of 1.82 g/cm$^3$ density, o 30**6 mm, was applied a coating of the (95 HfB$_2$+5C) % by weight composition, a 5% carboxymethyl cellulose solution being used as the finder. The heat treatment in silicon vapors was effected at the temperature of 1900° C. for 1.5 h under the pressure of 0.1 Hgmm.

Tests of the samples were carried out on a VGU-4 (BFY-4) high-speed electroless plasmatron in a dissociated air stream under the pressure of 0.1 to 0.35 atm and the gas stream rate of 130 to 205 m/s. These tests simulated the most severe conditions of the articles thermal cycling in an oxidizing medium.

The samples were subjected to cyclic loadings (1 cycle time was 10 min.).

The sample mass loss over the testing period was taken as an assessment criterion.

The results obtained are presented in Table 2.

TABLE 2

| Number of testing cycles | Testing temperature, °C. | Pressure atm | Mass Loss, mg |
|---|---|---|---|
| 1 | 1350 | 0.10 | +0.8 |
| 1 | 1500 | 0.10 | +2.9 |
| 1 | 1760 | 0.19 | +12.3 |
| 1 | 1760 | 0.18 | +36.2 |
| 4 | 1760 | 0.20 | +57.7 |
| 3 | 1760 | 0.20 | −35.6 |
| 1 | 1860 | 0.35 | −60.7 |

No visible change of the coating surface quality (cracks of peeling) was detected after the tests.

EXAMPLE 2

Onto samples of a two-dimensional carbon-carbon material based on the UMN-4 (BMH-4) high-modulus fiber of 1.75 g/cm$^3$ density, 30,65*5 mm size, in the form of gas turbine blades, was applied a coating of 95% by weight HfB$_2$+5% by weight C in a 5% carboxymethyl cellulose solution taken in the ratio of 1:1, of 300 μm thickness. The coated samples were treated in silicon vapors at the temperature of 1870° C. under 5 Hgmm for 2 h. They were bench tested in a stream of kerosene-air mixture combustion products: the stream temperature of up to 2000° C., pressure of 3.0 to 3.5 atm, flow rate of 300 m/s. The assessment criterion was the coated material mass loss for the testing period.

The results obtained are presented in Table 3.

TABLE 3

| Testing temperature, °C. | Pressure, atm | Testing time, min | Mass loss, mg |
|---|---|---|---|
| 1200 | 3.025 | 30 | +2.7 |
| 1300 | 3.050 | 60 | +3.9 |
| 1450 | 3.115 | 60 | −3.4 |
| 1600 | 3.200 | 60 | −10.8 |
| 1750 | 3.350 | 30 | −23.6 |

No visible surface defects were detected.

EXAMPLE 3

Onto samples of a two-dimensional siliconized carbon-carbon material based on the URAL-22-T (УРАЛ-22-T) fabric and the LUP-01 (ЛУп-01) tape (2:1 ratio) of 200*170*10 mm in size, upon bulk siliconizing, was applied a coating consisting of 95% by weight HfB$_2$ and 5% by weight of coke mixed with a 5% carboxymethyl cellulose solution in the volume ratio of 1:1. The coating thickness was 300 μm. Heat treatment was carried out in an electric vacuum furnace at the temperature of 1900° C. for 1 h in silicon vapors under the pressure of 10 Hgmm. The coated samples were bench tested in a gas stream of aviation fuel combustion products having a temperature over 1300° C., pressure of 0.3 MPa. The stream was directed onto the coated plate sample at an angle of 23 deg.

The results showed that the total mass loss of the coated sample was 1.6% by weight for 80 min. of exposure under thermal cyclic conditions (1 cycle time was 20 min.).

No visible defects were detected on the coated plate surface.

EXAMPLE 4

Onto a hollow cylindrical sample of o 60*150 mm and 5 mm thick of a siliconized carbon-carbon material of GRAVIMOL grade was applied (on each side) by a slip-baking technique a coating consisting of 95% by weight of hafnium diboride and 5% by weight of a carbon filler (petroleum coke). Then the coated material was treated in silicon vapors at the temperature of 1900° C. for 3 h, under the pressure of 5 Hg mm. The sample was bench tested in a high-temperature gas stream of aviation fuel combustion products. The characteristics of the stream: the oxidizing ability=1,1; T=2000° C., P=0.3 MPa, V=300 m/s, the gas stream direction being along the sample axis. The tests were cyclic. Heating up to 2000° C. was effected for 30 min., holding at this temperature was for 2.5 h, followed by cooling to room temperature for 40 min.. The coating quality was evaluated in terms of the sample mass loss and surface state thereof.

The test results showed that for 30 min. of operation under thermally loaded conditions the sample mass loss was 8.2%. The sample surface quality was satisfactory.

EXAMPLE 5

Onto samples of a non-siliconized graphite of GMZ (ГМ3) grade of o 40*40 mm was applied a protective antioxidative coating by heat-treating in silicon vapors in an electric vacuum furnace at the temperature of 1900° C., under 10 Hg mm, for 1.5 h, of the following composition: 50 parts by volume of (95% by weight $HfB_2$+5% by weight C)+50 parts by volume of 5% carboxymethyl cellulose. The tests were carried out in an open-type induction furnace at the temperature of 1750° C. under the natural atmospheric air convection. The tests were Cyclic. The time of 1 cycle was 30 min.. The coating quality was evaluated in terms of the coated sample mass loss for the testing time.

The results obtained are presented in Table 4.

TABLE 4

| Nos. | Testing time, min | Mass loss, % by weight | Oxidation rate, g/(cm$^2$ * min) |
| --- | --- | --- | --- |
| 1 | 30 | +0.18 | +0.59 * 10$^{-4}$ |
| 2 | 60 | +0.09 | +0.29 * 10$^{-4}$ |
| 3 | 90 | +0.18 | +0.59 * 10$^{-4}$ |
| 4 | 120 | +0.27 | +0.88 * 10$^{-4}$ |
| 5 | 150 | +0.18 | +0.59 * 10$^{-4}$ |
| 6 | 180 | −0.46 | −1.18 * 10$^{-4}$ |

No visible defects were detected on the sample surface.

The test results showed that the claimed parameters of the coating composition and the heat treatment conditions ensure a good workability of the coated articles under conditions close to those in the real service.

The claimed process for obtaining a coating:

ensures the oxidation protection of carbon-containing materials at an operating temperature of from 1700° to 2000° C.;

makes it possible to apply coatings onto articles of any configurations and dimensions;

requires no special equipment;

is useful for coating articles made of carbon materials both pre-siliconized and without such pretreatment.

INDUSTRIAL APPLICATION

The present invention can be useful in the industry for the oxidation protection of carbon-based articles operating at high temperatures.

For the industrial introduction of the present invention there are just required furnaces having an appropriate working space to accommodate articles to be treated.

We claim:

1. A process for obtaining protective coatings on carbon-based materials and articles, which comprises heat treatment of the surface to be protected in silicon vapors, characterized in that prior to said silicon vapor treatment, the surface to be protected is covered with a layer of a composition consisting of $HfB_2$+C powdery filler and a carboxymethyl cellulose-based binder, followed by drying under ambient conditions till it is completely dry.

2. A process according to claim 1, characterized in that said powdery components of said composition are taken in the $HfB_2$: C ratio of 95:5.

3. A process according to claim 1, characterized in that C powdery filler is carbon black.

4. A process according to claim 1, characterized in that said C powdery filler is artificial graphite.

5. A process according to claim 1, characterized in that said C powdery filler is coke.

6. A process according to claim 1, characterized in that said carboxymethyl cellulose is used as a 5% aqueous solution in the volume ratio to said powdery components of 1:1.

7. A process according to claim 1, characterized in that said $HfB_2$+C layer is treated in silicon vapors under a pressure of not over 10 Hg mm, at a temperature of about 1850° to 1900° C., for 1 to 3 h.

8. A process according to claim 1, characterized in that said layer of the composition consisting of the $HfB_2$+C filler and the carboxymethyl cellulose-based binder is applied onto a non-siliconized carbon material or article substrate.

* * * * *